United States Patent
Zhu

(10) Patent No.: US 9,999,245 B1
(45) Date of Patent: Jun. 19, 2018

(54) ELECTRONIC CIGARETTES HAVING CONCEALABLE MOUTHPIECES AND METHODS OF USING THE SAME

(71) Applicant: SHENZHEN KANGER TECHNOLOGY CO., LTD., Shenzhen (CN)

(72) Inventor: Xiaochun Zhu, Shenzhen (CN)

(73) Assignee: SHENZHEN KANGER TECHNOLOGY CO., LTD., Shenzhen, Guangdong (CN)

(*) Notice: Subject to any disclaimer, the term of this patent is extended or adjusted under 35 U.S.C. 154(b) by 0 days. days.

(21) Appl. No.: 15/456,726

(22) Filed: Mar. 13, 2017

(30) Foreign Application Priority Data

Mar. 13, 2017 (CN) .......................... 2017 1 0147529

(51) Int. Cl.
A24F 7/00 (2006.01)
A24F 47/00 (2006.01)
F16J 15/02 (2006.01)

(52) U.S. Cl.
CPC .............. *A24F 7/00* (2013.01); *A24F 47/008* (2013.01); *F16J 15/022* (2013.01)

(58) Field of Classification Search
CPC ........................................................ A24F 7/00
See application file for complete search history.

(56) References Cited

U.S. PATENT DOCUMENTS

| | | | | |
|---|---|---|---|---|
| 9,877,520 B2 * | 1/2018 | Rastogi | ................. | A24F 47/008 |
| 9,883,699 B2 * | 2/2018 | Zhu | ....................... | A24F 47/008 |
| 2013/0247910 A1 * | 9/2013 | Postma | ................. | A61M 11/041 |
| | | | | 128/203.26 |
| 2015/0108168 A1 * | 4/2015 | Truedsson | ........... | A47K 5/1205 |
| | | | | 222/153.13 |
| 2016/0022933 A1 * | 1/2016 | Ciancone | .......... | A61M 15/0086 |
| | | | | 128/200.23 |
| 2016/0050975 A1 * | 2/2016 | Worm | ................... | A24F 47/008 |
| | | | | 131/328 |
| 2016/0051716 A1 * | 2/2016 | Wheelock | ................. | A61L 9/03 |
| | | | | 392/387 |
| 2018/0027885 A1 * | 2/2018 | Qiu | ....................... | A24F 47/008 |

* cited by examiner

*Primary Examiner* — James Harvey
(74) *Attorney, Agent, or Firm* — Ming Jiang; MM IP Services LLC

(57) ABSTRACT

Present disclosure relates to electronic cigarettes having concealable mouthpiece and methods of using the same. In certain embodiments, the electronic cigarette includes: an E-liquid storage tank for storing E-liquid, a concealable mouthpiece assembly having a concealable mouthpiece to be concealed in a mouthpiece cover, a vaporizer assembly, and an E-liquid separation mechanism. The E-liquid storage tank is positioned on the E-liquid separation mechanism and the E-liquid separation base is rotatably positioned on a vaporizer base. The E-liquid separation mechanism has the E-liquid separation base and an E-liquid separation silicone gel ring to separate the E-liquid from the E-liquid storage tank from the vaporizer assembly. When a user rotates the E-liquid storage tank against the vaporizer base in a first direction, the concealable mouthpiece is raised upward for user to use. When user rotates E-liquid storage tank against vaporizer base in an opposite direction, concealable mouthpiece is concealed in mouthpiece cover.

20 Claims, 10 Drawing Sheets

ELECTRONIC CIGARETTES HAVING CONCEALABLE MOUTHPIECES AND METHODS OF USING THE SAME

FIELD

The present disclosure generally relates to the field of electronic cigarette, and more particularly to concealable mouthpieces for electronic cigarettes, electronic cigarettes having the concealable mouthpieces, and methods of using the electronic cigarettes having the concealable mouthpieces.

BACKGROUND

It is well known that smoking cigarette is harmful to smoker's health. The active ingredient in a cigarette is mainly nicotine. During smoking, nicotine, along with tar aerosol droplets produced in the cigarette burning, are breathed into the alveolus and absorbed quickly by the smoker. Once nicotine is absorbed into the blood of the smoker, nicotine then produces its effect on the receptors of the smoker's central nervous system, causing the smoker relax and enjoy an inebriety similar to that produced by an exhilarant.

The electronic cigarette is sometimes referred as electronic vaporing device, personal vaporizer (PV), or electronic nicotine delivery system (ENDS). It is a battery-powered device which simulates tobacco smoking. It generally uses a heating element that vaporizes a liquid solution (E-liquid). Some solutions contain a mixture of nicotine and a variety of flavorings, while others release a flavored vapor without nicotine. Many are designed to simulate smoking experience, such as cigarette smoking or cigar smoking. Some of them are made with similar appearance, while others are made considerably different in appearance.

Conventional electronic cigarettes has a fixed mouthpiece, and the mouthpiece is always exposed even when the electronic cigarettes are not in use. Surrounding elements may contaminate the mouthpiece. It is desirable that the electronic cigarettes have concealable mouthpieces such that when the electronic cigarettes are not in use, the mouthpieces can be concealed to avoid contamination.

Therefore, an unaddressed need exists in the art to address the aforementioned deficiencies and inadequacies.

SUMMARY

In one aspect, the present disclosure relates to a concealable mouthpiece assembly for an electronic cigarette. In certain embodiments, the concealable mouthpiece assembly includes: an E-liquid storage tank for storing E-liquid, a concealable mouthpiece, and a mouthpiece moving mechanism for concealing the concealable mouthpiece. The E-liquid storage tank has a top end, a bottom end, an internal wall, and an external wall. The E-liquid storage tank is positioned on an E-liquid separation base of an E-liquid separation mechanism and the E-liquid separation base is rotatably positioned on a vaporizer base. The mouthpiece moving mechanism is attached to the top end of the E-liquid storage tank. The mouthpiece moving mechanism defines a first mouthpiece moving groove and an opposite second mouthpiece moving groove. The concealable mouthpiece includes a vapor exit, a first mouthpiece moving rod, and an opposite, second mouthpiece moving rod. The vapor exit of the concealable mouthpiece is installed inside of a mouthpiece cover with the vapor exit slidedly positioned inside of the internal wall of the E-liquid storage tank. The first mouthpiece moving rod extends into the first mouthpiece moving groove, and the second mouthpiece moving rod extends into the second mouthpiece moving groove. When a user rotates the E-liquid storage tank against the vaporizer base in a first direction, the concealable mouthpiece is moved upward to be ready for the user to use the electronic cigarette. When the user rotates the E-liquid storage tank against the vaporizer base in an opposite, second direction, the concealable mouthpiece is retracted downward to be concealed in the mouthpiece cover.

In another aspect, the present disclosure relates to an electronic cigarette. In certain embodiments, the electronic cigarette includes: an E-liquid storage tank for storing E-liquid, a concealable mouthpiece assembly having a concealable mouthpiece to be concealed in a mouthpiece cover when the electronic cigarette is not in use, a vaporizer assembly, and an E-liquid separation mechanism. The E-liquid storage tank has a top end, a bottom end, an internal wall, and an external wall. The E-liquid storage tank is positioned on an E-liquid separation base of the E-liquid separation mechanism and the E-liquid separation base is rotatably positioned on a vaporizer base. The concealable mouthpiece assembly includes the concealable mouthpiece to be concealed in the mouthpiece cover when the electronic cigarette is not in use. The vaporizer assembly has a heating element positioned on the vaporizer base to vaporize the E-liquid from the E-liquid storage tank. The E-liquid separation mechanism has the E-liquid separation base and an E-liquid separation silicone gel ring to separate the E-liquid from the E-liquid storage tank from the vaporizer assembly. When a user rotates the E-liquid storage tank against the vaporizer base in a first direction, the concealable mouthpiece is raised upward to be ready for the user to use the electronic cigarette. When the user rotates the E-liquid storage tank against the vaporizer base in an opposite, second direction, the concealable mouthpiece is retracted downward to be concealed in the mouthpiece cover.

In yet another aspect, the present disclosure relates to a method of using an electronic cigarette having a concealable mouthpiece. In certain embodiments, the method includes: rotating, by a user, an E-liquid storage tank of the electronic cigarette against a vaporizer base in a first direction, to raise the concealable mouthpiece, and to turn on an E-liquid supply from the E-liquid storage tank to an E-liquid storage medium of a vaporizer assembly of the electronic cigarette through an E-liquid separation mechanism, and sucking, by the user, air through an air path over the raised concealable mouthpiece such that the airflow caused by the sucking action activates an airflow activated switch to electrically connect a positive terminal of an electrical power supply to a positive terminal of a heating element of the vaporizer assembly to vaporize the E-liquid in the E-liquid storage medium.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure.

Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
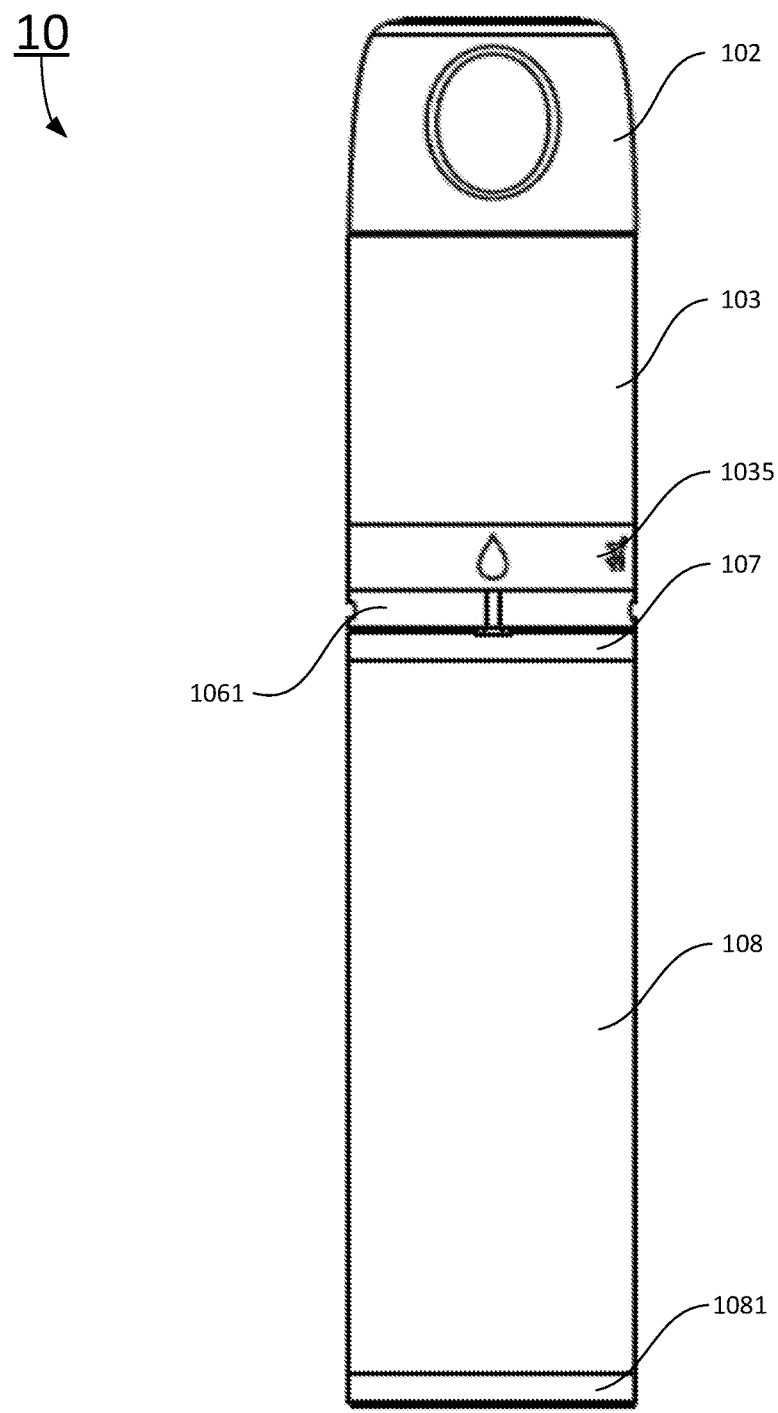
FIG. 1 is an external side view of an exemplary electronic cigarette having a concealable mouthpiece according to certain embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present disclosure be fully understood, but the present disclosure may also be implemented by using other manners different from those described herein, so that the present disclosure is not limited by the specific embodiments disclosed in the following.

The description will be made as to the embodiments of the present disclosure in conjunction with the accompanying drawings FIGS. 1 through 10.

Figure 4:
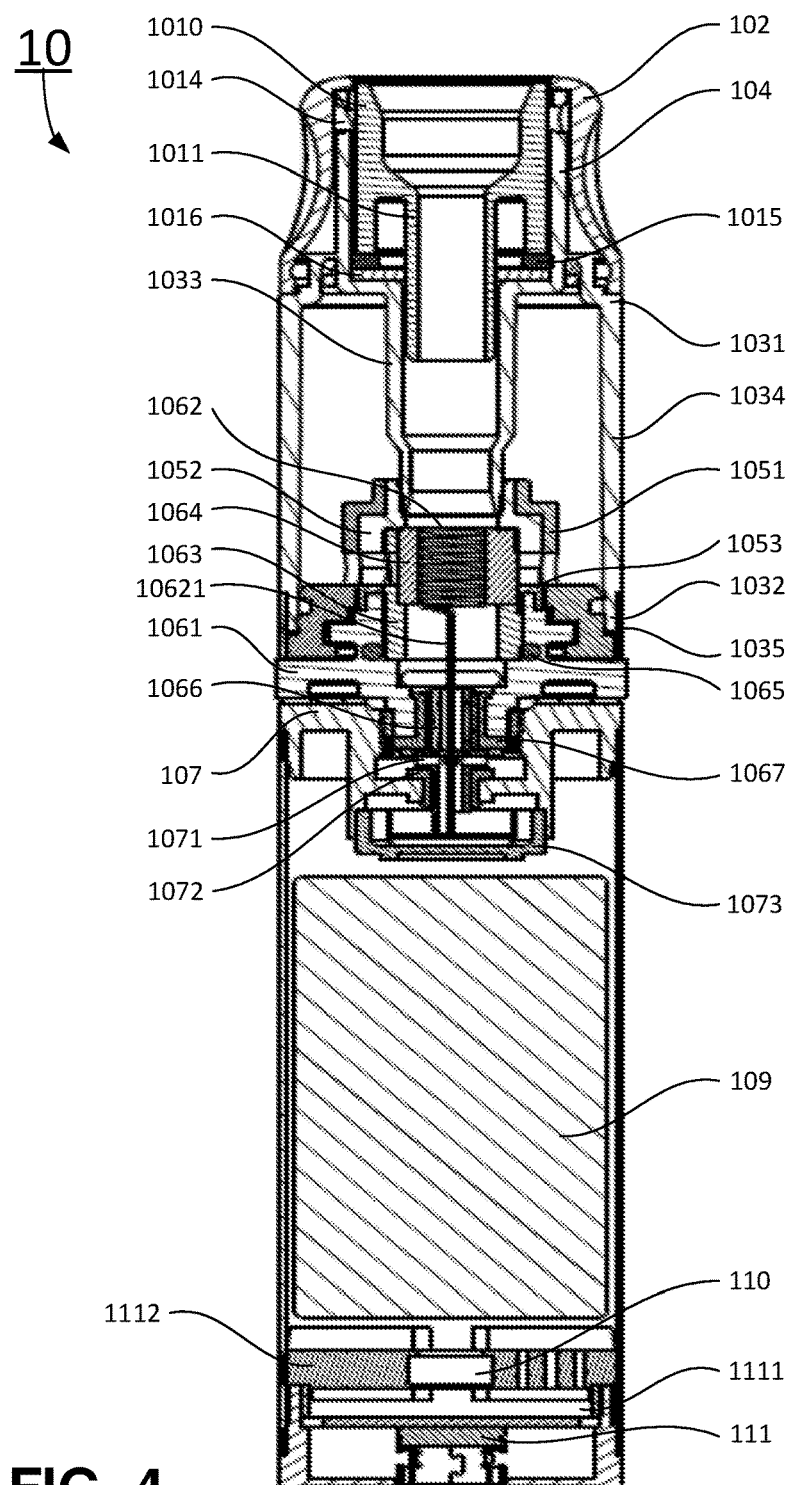
FIG. 4 is a detailed sectional view of the exemplary electronic cigarette having the concealable mouthpiece according to certain embodiments of the present disclosure.
Figure 5:
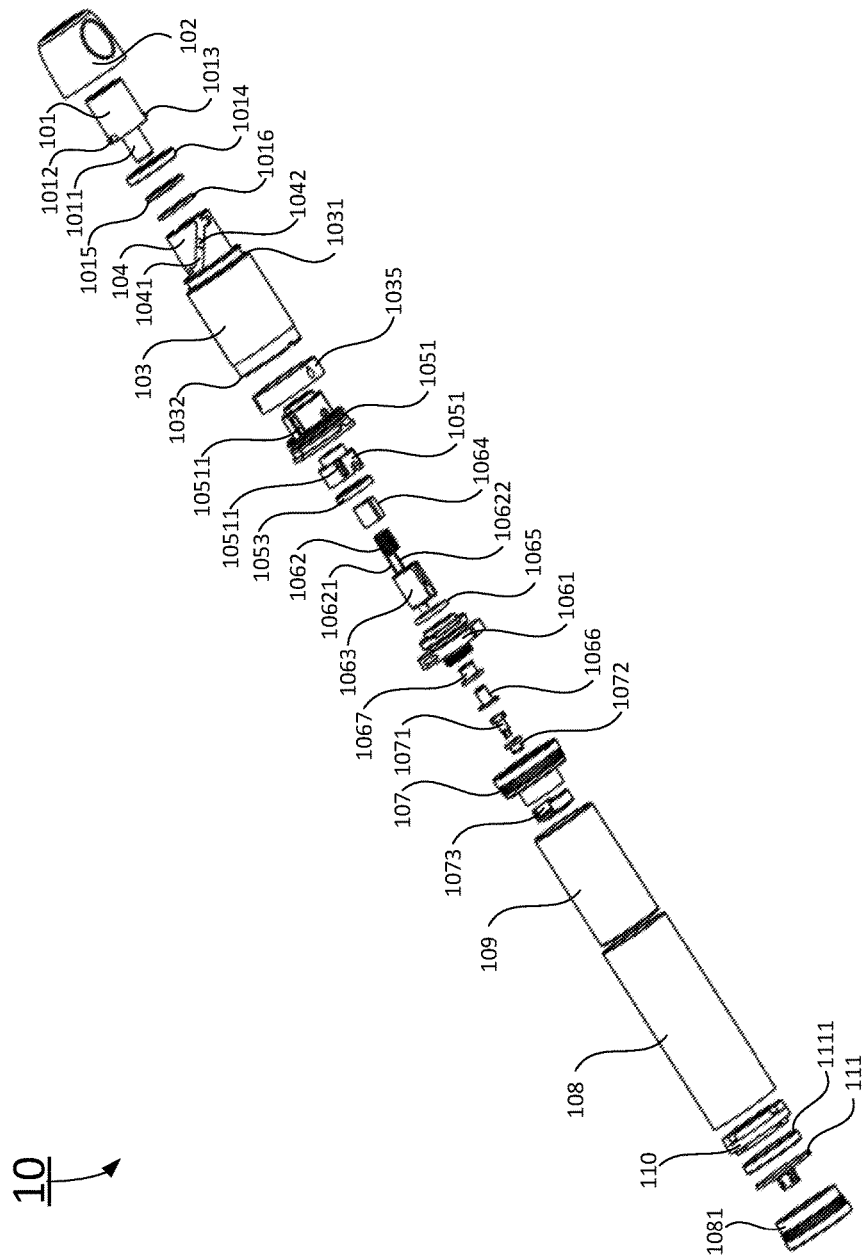
FIG. 5 is a detailed perspective exploded view of the exemplary electronic cigarette having the concealable mouthpiece according to certain embodiments of the present disclosure.
Figure 6:
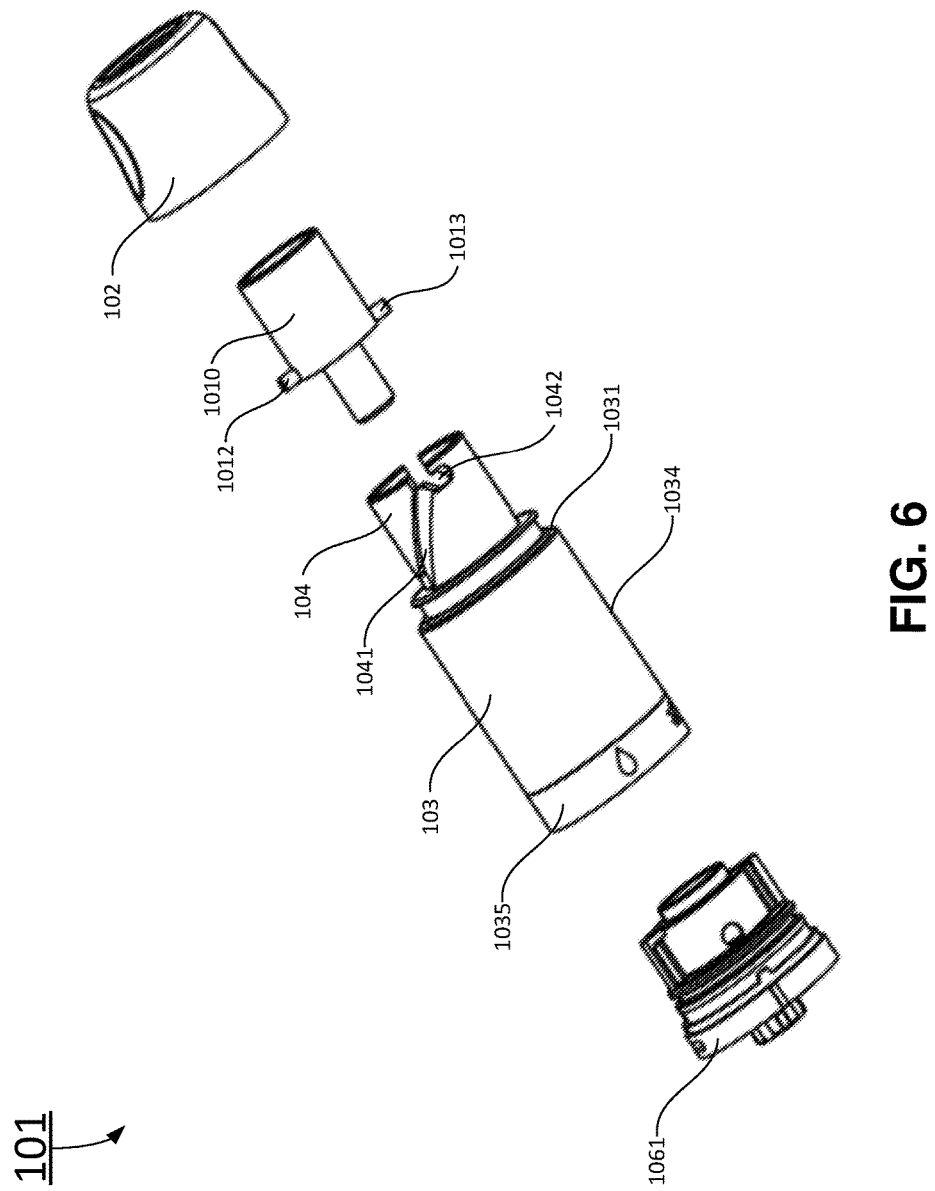
FIG. 6 is a detailed perspective exploded view of the concealable mouthpiece assembly of the exemplary electronic cigarette according to certain embodiments of the present disclosure.

In one aspect, the present disclosure relates to a concealable mouthpiece assembly 101 for an electronic cigarette 10 as shown in FIGS. 4 through 6 according to certain embodiments of the present disclosure. In certain embodiments, the concealable mouthpiece assembly 101 includes: an E-liquid storage tank 103 for storing E-liquid, a concealable mouthpiece 1010, and a mouthpiece moving mechanism 104 for concealing the concealable mouthpiece 1010. The E-liquid storage tank 103 has a top end 1031, a bottom end 1032, an internal wall 1033, and an external wall 1034. The E-liquid storage tank 103 is positioned on an E-liquid separation base 1051 of an E-liquid separation mechanism 105 and the E-liquid separation base 1051 is rotatably positioned on a vaporizer base 1061. The mouthpiece moving mechanism 104 is attached to the top end 1031 of the E-liquid storage tank 103.

In certain embodiments, the mouthpiece moving mechanism 104 defines a first mouthpiece moving groove 1041 and an opposite second mouthpiece moving groove 1042. The concealable mouthpiece 1010 includes a vapor exit 1011, a first mouthpiece moving rod 1012, and an opposite, second mouthpiece moving rod 1013. The vapor exit 1011 of the concealable mouthpiece 1010 is installed inside of a mouthpiece cover 102 with the vapor exit 1011 slidely positioned inside of the internal wall 1033 of the E-liquid storage tank 103. The first mouthpiece moving rod 1012 extends into the first mouthpiece moving groove 1041, and the second mouthpiece moving rod 1013 extends into the second mouthpiece moving groove 1042. When a user rotates the E-liquid storage tank 103 against the vaporizer base 1061 in a first direction, the concealable mouthpiece 1010 is moved upward to be ready for the user to use the electronic cigarette 10. When the user rotates the E-liquid storage tank 103 against the vaporizer base 1061 in an opposite, second direction, the concealable mouthpiece 1010 is retracted downward to be concealed in the mouthpiece cover 102.

In certain embodiments, the concealable mouthpiece assembly 101 includes a stationary ring 1035 attached to the vaporizer base 1061. When the E-liquid storage tank 103 is rotated, the stationary ring 1035 stays with the vaporizer base 1061 and remains stationary. In certain embodiments, the concealable mouthpiece assembly 101 includes a first sealing ring 1014, a pressing ring 1015, and a second sealing ring 1016. The first sealing ring 1014 prevents the concealable mouthpiece 1010 from leaking air or vapor at an upper end of the concealable mouthpiece assembly 101. The concealable mouthpiece 1010 presses on the pressing ring 1015 when the concealable mouthpiece 1010 is concealed. The second sealing ring 1016 prevents the concealable mouthpiece 1010 from leaking air or vapor at a lower end of the concealable mouthpiece assembly 101.

In certain embodiments, the E-liquid separation mechanism 105 includes: the E-liquid separation base 1051 and an E-liquid separation silicone gel ring 1052. The E-liquid separation base 1051 defines a first E-liquid opening 10511 and a second E-liquid opening 10512. The E-liquid separation base 1051 is rotatably attached to the vaporizer base 1061. The E-liquid separation silicone gel ring 1052 defines a first E-liquid opening 10521 and a second E-liquid opening 10522. The E-liquid separation silicone gel ring 1052 is fixedly attached to the vaporizer base 1061. When the user rotates the E-liquid storage tank 103 against the vaporizer base 1061 in a predetermined angle in the first direction, the first E-liquid opening 10511 and the second E-liquid opening 10512 of the E-liquid separation base 1051 coincide to the first E-liquid opening 10521 and the second E-liquid opening 10522 of the E-liquid separation silicone gel ring 1052 to allow the E-liquid stored in the E-liquid storage tank 103 to flow into an E-liquid storage medium 1064 to be vaporized by a vaporizer assembly 106. When the user rotates the E-liquid storage tank 103 against the vaporizer base 1061 in the predetermined angle in the opposite, second direction, the first E-liquid opening 10511 and the second E-liquid opening 10512 of the E-liquid separation base 1051 do not coincide to the first E-liquid opening 10521 and the second E-liquid opening 10522 of the E-liquid separation silicone gel ring 1052 and the E-liquid flow between the E-liquid storage tank 103 and the E-liquid storage medium 1064 is shut off.

In certain embodiments, the vaporizer assembly 106 includes: a heating element 1062, the E-liquid storage medium 1064, and a vaporizer positive terminal 1066. The heating element 1062 is positioned on a heating element base 1063, and has a positive terminal 10621 and a negative terminal 10622. The negative terminal 10622 is electrically coupled to the vaporizer base 1061. The E-liquid storage medium 1064 receives the E-liquid from the E-liquid storage tank 103 through the E-liquid separation mechanism 105, where the E-liquid supply to the E-liquid storage medium 1064 may be turned on or shut off by the user using the E-liquid separation mechanism 105. The vaporizer positive terminal 1066 is electrically coupled to the positive terminal 10621 of the heating element 1062 and a positive terminal of an electrical power supply 109. The vaporizer assembly 106 may also include a vaporizer isolation ring 1067 to isolate the vaporizer positive terminal 1066 from the vaporizer base 1061 electrically connected to a negative terminal of the electrical power supply 109.

In certain embodiments, the heating element 1062 includes one or more of: aluminum (Al), Chromium (Cr), Manganese (Mn), Iron (Fe), Cobalt (Co), Nickel (Ni), Copper (Cu), Zirconium (Zr), Niobium (Nb), Molybdenur (Mo), Rhenium (Re), Silver (Ag), Cadmium (Cd), Tantalum (Ta), Tungsten (W), Iridium (Ir), Platinum (Pt), Gold (Au), and any alloy of these materials. The heating element 1062 may be one of: a grid shaped heating element, a mesh shaped heating element, a net shaped heating element, a spiral heating element, and any combination of these shapes. The E-liquid storage medium 1064 may include: cotton fibers, polypropylene fibers, terylene fibers, nylon fibers, and porous ceramic materials.

In certain embodiments, the present disclosure relates to an electronic cigarette 10 having the concealable mouthpiece assembly 101 as disclosed above.

In another aspect, the present disclosure relates to an electronic cigarette 10. Referring now to FIGS. 1 through 6, in certain embodiments, the electronic cigarette 10 includes: an E-liquid storage tank 103 for storing E-liquid, a concealable mouthpiece assembly 101 having a concealable mouthpiece 1010 to be concealed in a mouthpiece cover 102 when the electronic cigarette 10 is not in use, a vaporizer assembly 106, and an E-liquid separation mechanism 105.

In certain embodiments, the E-liquid storage tank 103 has a top end 1031, a bottom end 1032, an internal wall 1033, and an external wall 1034. The E-liquid storage tank 103 is positioned on an E-liquid separation base 1051 of the E-liquid separation mechanism 105 and the E-liquid separation base 1051 is rotatably positioned on a vaporizer base 1061. The concealable mouthpiece assembly 101 includes a concealable mouthpiece 1010 to be concealed in a mouthpiece cover 102 when the electronic cigarette 10 is not in use. The vaporizer assembly 106 has a heating element 1062 positioned on the vaporizer base 1061 to vaporize the E-liquid from the E-liquid storage tank 103. The E-liquid separation mechanism 105 has the E-liquid separation base 1051 and an E-liquid separation silicone gel ring 1052 to separate the E-liquid from the E-liquid storage tank 103 from the vaporizer assembly 106. When a user rotates the E-liquid storage tank 103 against the vaporizer base 1061 in a first direction, the concealable mouthpiece 1010 is raised upward to be ready for the user to use the electronic cigarette 10. When the user rotates the E-liquid storage tank 103 against the vaporizer base 1061 in an opposite, second direction, the concealable mouthpiece 1010 is retracted downward to be concealed in the mouthpiece cover 102.

In certain embodiments, the concealable mouthpiece assembly 101 includes: a mouthpiece moving mechanism 104, and the concealable mouthpiece 1010. The mouthpiece moving mechanism 104 is attached to the top end 1031 of the E-liquid storage tank 103. The mouthpiece moving mechanism 104 defines a first mouthpiece moving groove 1041 and an opposite second mouthpiece moving groove 1042. The concealable mouthpiece 1010 includes a vapor exit 1011, a first mouthpiece moving rod 1012, and an opposite, second mouthpiece moving rod 1013. The vapor exit 1011 of the concealable mouthpiece 1010 is installed inside of the mouthpiece cover 102 with the vapor exit 1011 slidedly positioned inside of the internal wall 1033 of the E-liquid storage tank 103. The first mouthpiece moving rod 1012 extends into the first mouthpiece moving groove 1041 and the second mouthpiece moving rod 1013 extends into the second mouthpiece moving groove 1042.

When the user rotates the E-liquid storage tank 103 against the vaporizer base 1061 in a first direction, the first mouthpiece moving groove 1041 and the second mouthpiece moving groove 1042 of the rotating mouthpiece moving mechanism 104 push the first mouthpiece moving rod 1012 and the second mouthpiece moving rod 1013 of the concealable mouthpiece 1010 upwards such that the concealable mouthpiece 1010 is moved upward. When the user rotates the E-liquid storage tank 103 against the vaporizer base 1061 in the opposite, second direction, the first mouthpiece moving groove 1041 and the second mouthpiece moving groove 1042 of the rotating mouthpiece moving mechanism 104 retract the first mouthpiece moving rod 1012 and the second mouthpiece moving rod 1013 of the concealable mouthpiece 1010 downwards such that the concealable mouthpiece 1010 is moved downward to be concealed in the mouthpiece cover 102.

In certain embodiments, the E-liquid separation mechanism 105 includes the E-liquid separation base 1051 and an E-liquid separation silicone gel ring 1052. The E-liquid separation base 1051 defines a first E-liquid opening 10511 and a second E-liquid opening 10512. The E-liquid separation base 1051 is rotatably attached to the vaporizer base 1061. The E-liquid separation silicone gel ring 1052 defines a first E-liquid opening 10521 and a second E-liquid opening 10522. The E-liquid separation silicone gel ring 1052 is fixedly attached to the vaporizer base 1061. The E-liquid separation mechanism 105 may include a third sealing ring 1053. The third sealing ring 1053 is installed under the E-liquid separation base 1051 and the E-liquid separation silicone gel ring 1052 to prevent the E-liquid in the E-liquid storage medium 1064 from leaking out of the vaporizer assembly 106.

When the user rotates the E-liquid storage tank 103 against the vaporizer base 1061 in a predetermined angle in the first direction, the first E-liquid opening 10511 and the second E-liquid opening 10512 of the E-liquid separation base 1051 coincide to the first E-liquid opening 10521 and the second E-liquid opening 10522 of the E-liquid separation silicone gel ring 1052 to allow the E-liquid stored in the E-liquid storage tank 103 to flow into an E-liquid storage medium 1064 to be vaporized by the vaporizer assembly 106. When the user rotates the E-liquid storage tank 103 against the vaporizer base 1061 in the predetermined angle in the opposite, second direction, the first E-liquid opening 10511 and the second E-liquid opening 10512 of the E-liquid separation base 1051 do not coincide to the first E-liquid opening 10521 and the second E-liquid opening 10522 of the E-liquid separation silicone gel ring 1052 and the E-liquid flow between the E-liquid storage tank 103 and the E-liquid storage medium 1064 is shut off.

In certain embodiments, the vaporizer assembly 106 includes: the E-liquid storage medium 1064, the heating element 1062, and a vaporizer positive terminal 1066. The E-liquid storage medium 1064 receives the E-liquid from the E-liquid storage tank 103 through the E-liquid separation mechanism 105. The heating element 1062 is positioned on a heating element base 1063 and in direct contact with an interior surface of the E-liquid storage medium 1064 to heat the E-liquid received from the E-liquid storage tank 103. The heating element 1062 has a positive terminal 10621 and a negative terminal 10622. The positive terminal 10621 of the heating element 1062 is electrically coupled to the vaporizer positive terminal 1066 and a positive terminal 1091 of an electrical power supply 109. The negative terminal 10622 of the heating element 1062 is electrically coupled to the vaporizer base 1061 and a negative terminal 1092 of the electrical power supply 109. The vaporizer assembly 106 also includes a vaporizer isolation ring 1067 to isolate the vaporizer positive terminal 1066 from the vaporizer base 1061 which is electrically connected to the negative terminal of the electrical power supply 109. In certain embodiments, the vaporizer assembly 106 may include a fourth sealing ring 1065. The fourth sealing ring 1065 is positioned between the heating element base 1063 and the vaporizer base 1061.

In certain embodiments, the heating element 1062 includes one or more of: aluminum (Al), Chromium (Cr), Manganese (Mn), Iron (Fe), Cobalt (Co), Nickel (Ni), Copper (Cu), Zirconium (Zr), Niobium (Nb), Molybdenur (Mo), Rhenium (Re), Silver (Ag), Cadmium (Cd), Tantalum (Ta), Tungsten (W), Iridium (Ir), Platinum (Pt), Gold (Au), and any alloy of these materials. The heating element 1062 may be one of: a grid shaped heating element, a mesh shaped heating element, a net shaped heating element, a spiral heating element, and any combination of these shapes. The E-liquid storage medium 1064 may include: cotton fibers, polypropylene fibers, terylene fibers, nylon fibers, and porous ceramic materials.

Figure 7:
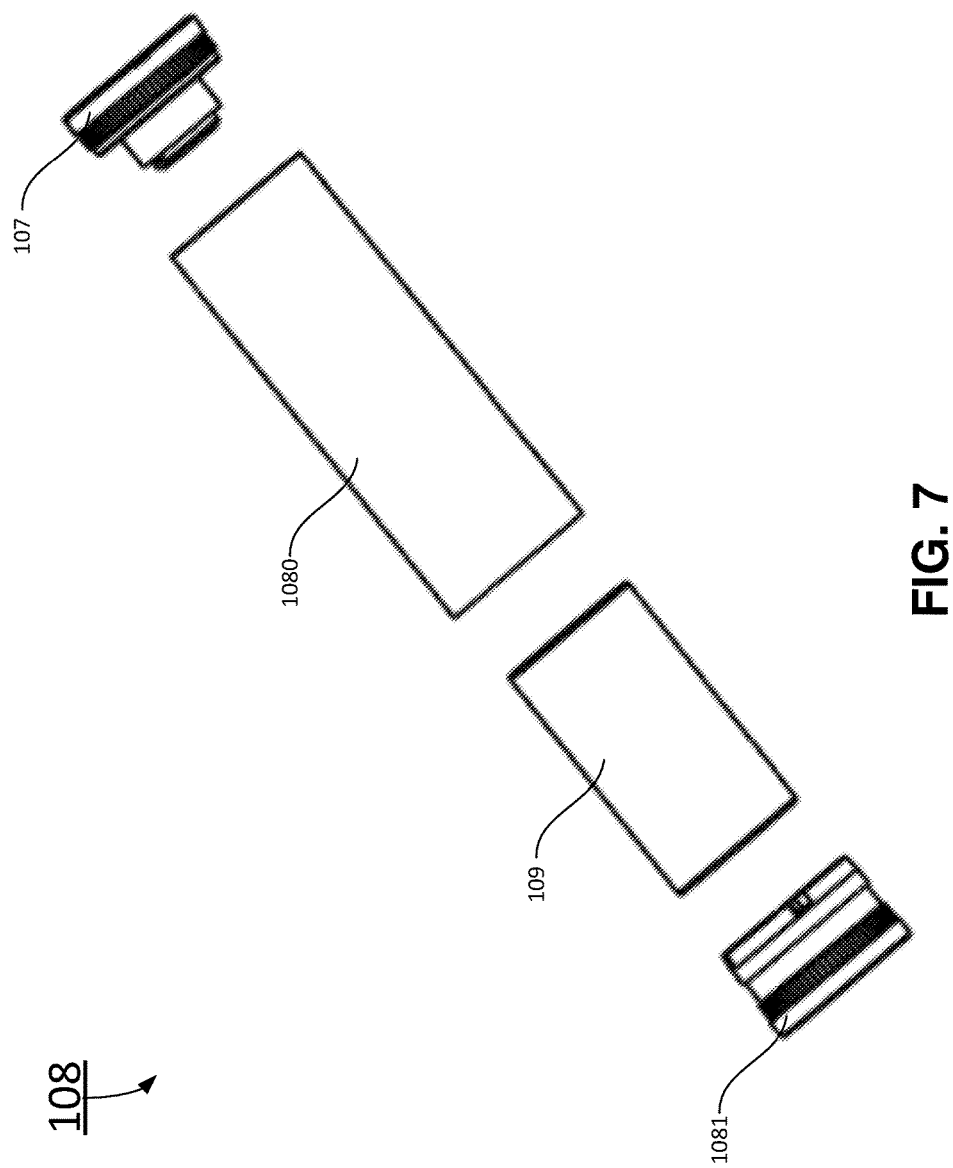
FIG. 7 is a detailed perspective exploded view of an electronic cigarette body of the exemplary electronic cigarette having the concealable mouthpiece according to certain embodiments of the present disclosure.

In certain embodiments, the electronic cigarette 10 includes an electronic cigarette body 108 as shown in FIG. 7. The electronic cigarette body 108 includes a cylindrical electronic cigarette body 1080. The cylindrical electronic cigarette body 1080 has an electronic cigarette base 1081 at a bottom end of the cylindrical electronic cigarette body 1080 and an electrical power contact ring 107 at a top end of the cylindrical electronic cigarette body 1080. The electronic cigarette base 1081 has one or more air intake openings to form an air path. The electrical power contact ring 107 includes a positive terminal 1071 electrically coupled to the positive terminal 1091 of the electrical power supply 109, an insolation ring 1072 of the electrical power supply 109, and a separation pad 1073. Each of the positive terminal 1071, the insolation ring 1072, and the separation pad 1073 has a ring shape and they are coaxially attached to each other and the centers of the positive terminal 1071, the insolation ring 1072, and the separation pad 1073 form a part of the air path.

The electronic cigarette body 108 may also include the electrical power supply 109 positioned inside the cylindrical electronic cigarette body 1080. The positive terminal 1091 of the electrical power supply 109 is electrically coupled to the positive terminal 10621 of the heating element 1062 through an airflow activated switch 110. The negative terminal 1092 of the electrical power supply 109 is electrically coupled to the electronic cigarette body 108, which is also connected to the vaporizer base 1061.

Figure 2:
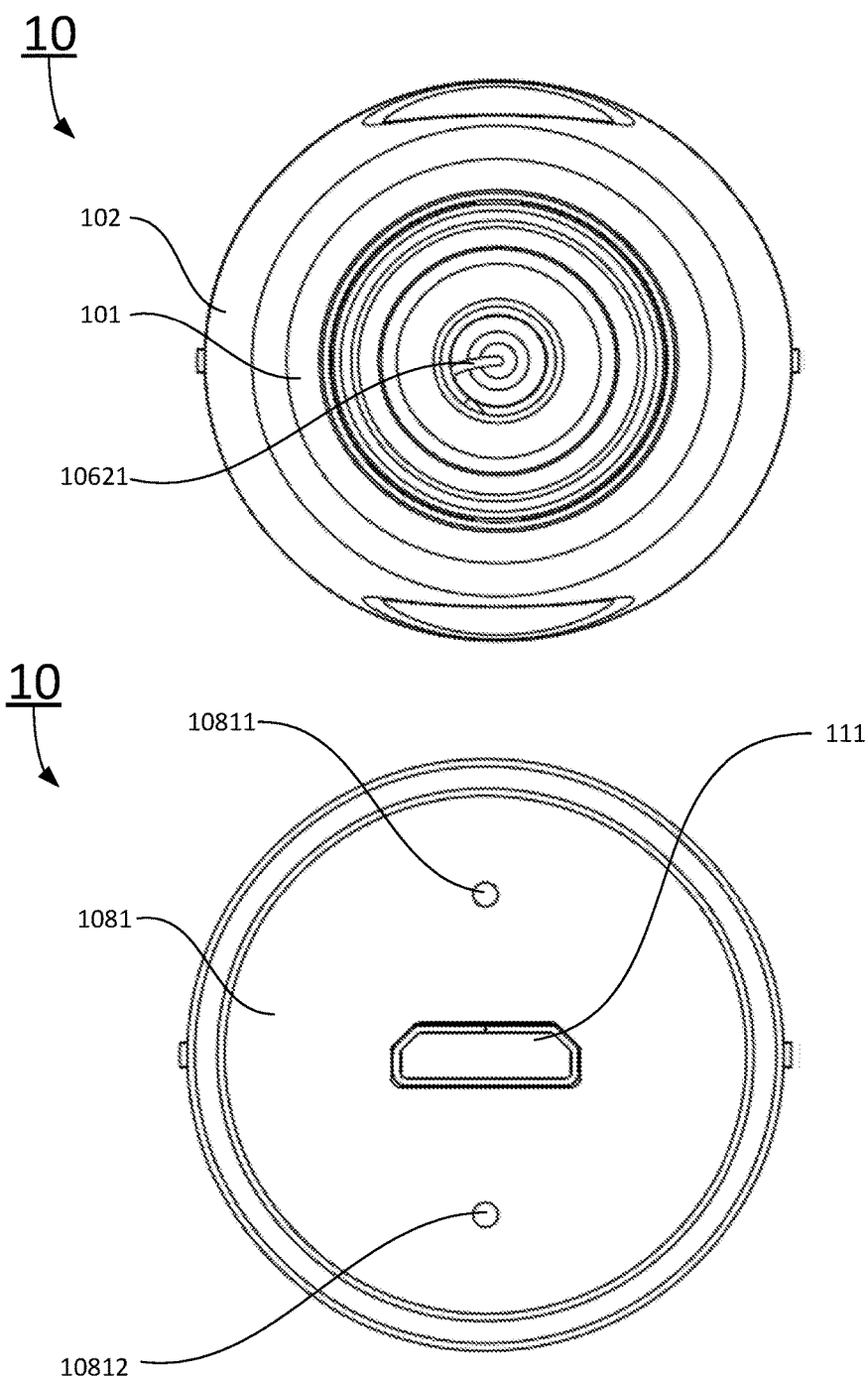
FIG. 2 shows a top view and a bottom view of the exemplary electronic cigarette having a concealable mouthpiece according to certain embodiments of the present disclosure.
Figure 3:
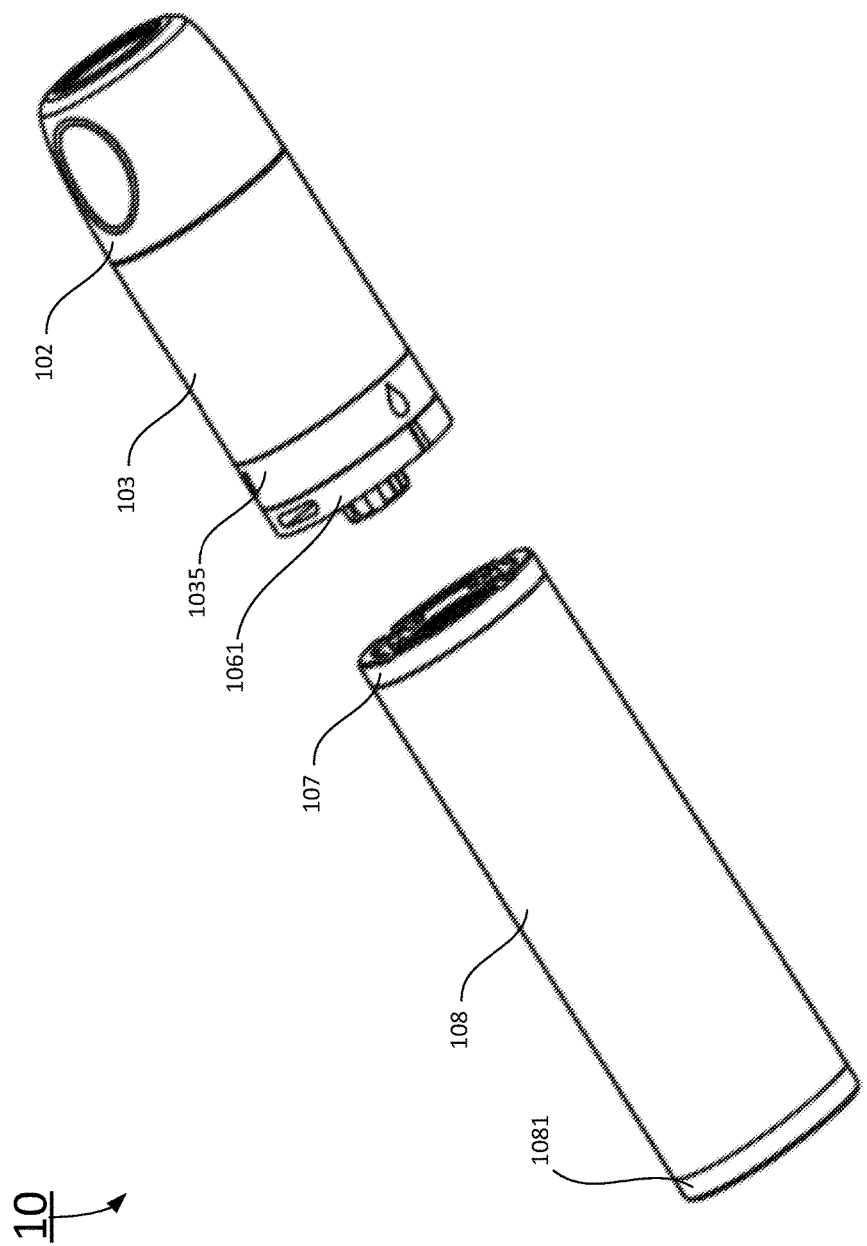
FIG. 3 is an exploded perspective view of the exemplary electronic cigarette showing top portion of the electronic cigarette having the concealable mouthpiece, E-liquid storage tank, and a vaporizer base and a bottom portion having an electronic cigarette body according to certain embodiments of the present disclosure.

In one embodiment as shown in FIG. 2, the electronic cigarette base 1081 includes a first air intake opening 10811 and a second air intake opening 10812. The air path includes the first air intake opening 10811 and the second air intake opening 10812, the airflow activated switch 110, spaces around the electrical power supply 109, the centers of the positive terminal 1071, the insolation ring 1072, and the separation pad 1073, the vaporizer assembly 106, and vapor exit 1011 of the concealable mouthpiece 1010.

In certain embodiments, after the user rotates the E-liquid storage tank 103 against the vaporizer base 1061 to raise the concealable mouthpiece 1010 and allows the E-liquid stored in the E-liquid storage tank 103 to flow into the E-liquid storage medium 1064, the users sucks air through the air path over the raised concealable mouthpiece 1010 such that the airflow caused by the sucking action activates the airflow activated switch 110 to electrically connect the positive terminal 1091 of the electrical power supply 109 to the positive terminal 10621 of the heating element 1062 to vaporize the E-liquid in the E-liquid storage medium 1064. The electric power supply 109 is automatically connected when the user sucks air/vapor through the concealable mouthpiece 1010 and the air path, and shut off when the user stops sucking the air/vapor through the concealable mouthpiece 1010 and the air path.

In certain embodiments, the electrical power supply 109 includes a rechargeable battery. The rechargeable battery may include Nickel Cadium (NiCd) battery, Nickel-Metal Hydride (NiMH) battery, Lead Acid battery, Lithium Ion battery, and Lithium Polymer battery. The electronic cigarette body 108 includes a universal serial bus (USB) interface assembly 111 to recharge the rechargeable battery, a USB interface assembly installation ring 1111, and a silicone gel pad 1112 to provide a cushion to between the electrical power supply 109 and the USB interface assembly 111.

Figure 8A:
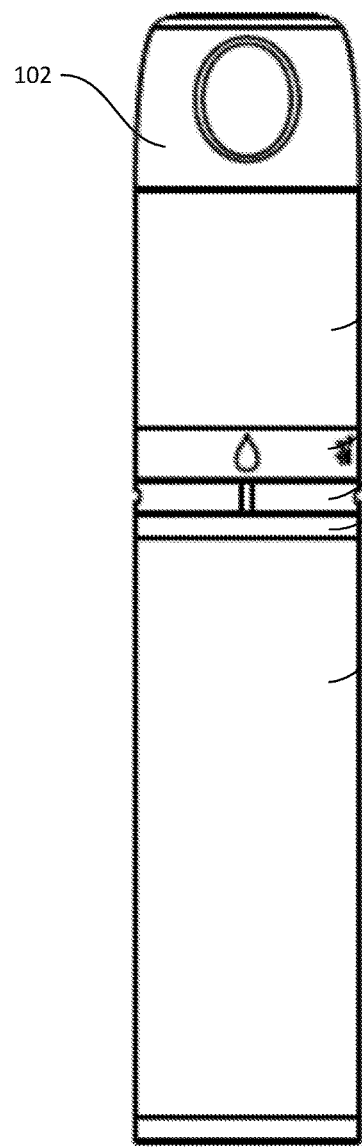
FIG. 8A is a front view of the exemplary electronic cigarette with the concealable mouthpiece concealed.
Figure 8B:
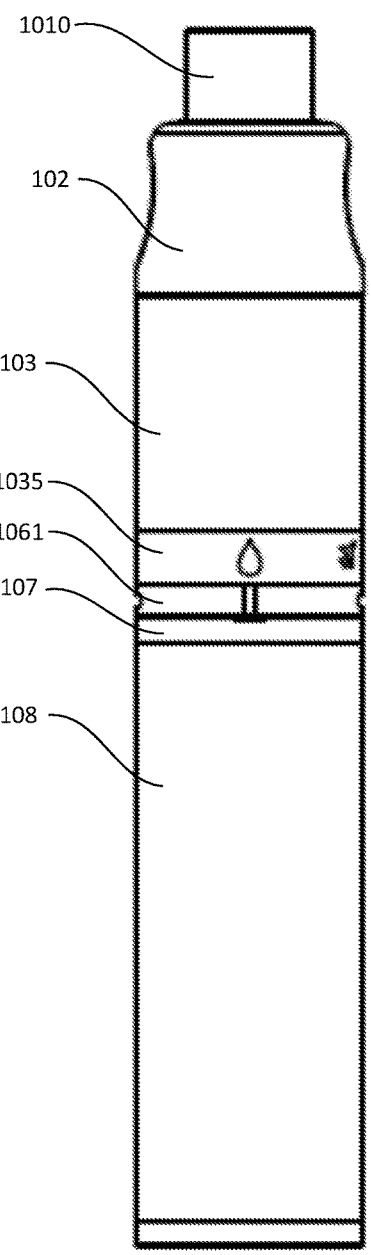
FIG. 8B is the front view of the exemplary electronic cigarette with the concealable mouthpiece raised according to certain embodiments of the present disclosure.

Referring now to FIGS. 8 and 9, each of the FIG. 8 and FIG. 9 shows a front view of the exemplary electronic cigarette with the concealable mouthpiece concealed, and the front view of the exemplary electronic cigarette with the concealable mouthpiece raised to show how the concealable mouthpiece moving mechanism 104 works according to certain embodiments of the present disclosure. In certain embodiments, the electronic cigarette body 108, the electrical power contact ring 107, the vaporizer base 1061 and the stationary ring 1035 are fixedly attached together. The E-liquid storage tank 103 and mouthpiece cover 102 are fixedly attached to each other. The E-liquid storage tank 103 is rotatably attached to the vaporizer base 1061. FIG. 8A shows the concealable mouthpiece 1010 is in a concealed position. When the user rotates the E-liquid storage tank 103 against the vaporizer base 1061 in a predetermined angle in a first direction, the concealable mouthpiece 1010 is moved upwards as shown in FIG. 8B. In one embodiment, the predetermined angle is 90 degrees, and the first direction is counter-clock wise. Only the top portion (the E-liquid storage tank 103 and the mouthpiece cover 102) is rotated counter-clock wise and the lower portion (the stationary ring 1035, the vaporizer base 1061, the electrical power contact ring 107, and the electronic cigarette body 108) remains stationary.

Figures 9A, 9B:
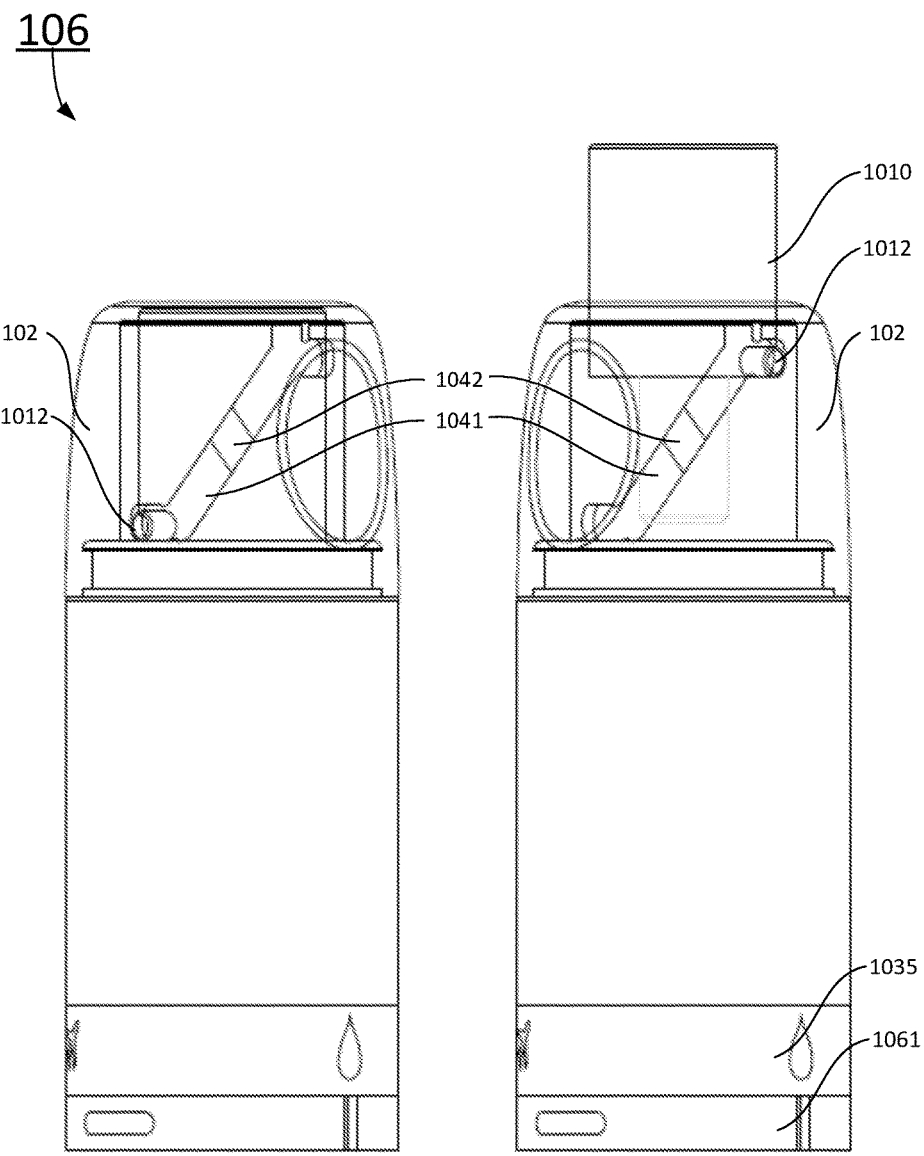
FIG. 9A is a front view of the top portion of the exemplary electronic cigarette with the concealable mouthpiece concealed.
FIG. 9B is the front view of the top portion of the exemplary electronic cigarette with the concealable mouthpiece raised, showing how the concealable mouthpiece moving mechanism works according to certain embodiments of the present disclosure.

FIG. 9A shows a front view of the top portion of the exemplary electronic cigarette with the concealable mouthpiece in a concealed position. When the user rotates the E-liquid storage tank 103 and the mouthpiece cover 102 clockwise about 90 degrees, the first mouthpiece moving groove 1041 pushes the first mouthpiece moving rod 1012 upwards and the second mouthpiece moving groove 1042 pushes the second mouthpiece moving rod 1013 upwards, respectively, such that the concealable mouthpiece 1010 is pushed upwards to a ready to use position as shown in FIG. 9B. When the user rotates the E-liquid storage tank 103 and the mouthpiece cover 102 counter clockwise about 90 degrees, the first mouthpiece moving groove 1041 pushes the first mouthpiece moving rod 1012 downwards and the second mouthpiece moving groove 1042 pushes the second mouthpiece moving rod 1013 downwards, respectively, such that the concealable mouthpiece 1010 is retracted to the concealed position as shown in FIG. 9A.

In certain embodiments, rotating the E-liquid storage tank 103 against the vaporizer base 1061 achieves at least two functions at the same time: (1) moving the concealable mouthpiece 1010 upwards to be ready for the user to use, and (2) turning on E-liquid supply from the E-liquid storage tank 103 to the E-liquid storage medium 1064. Once these two functions are performed, the electronic cigarette 10 is ready to be used by the user. When the user sucks the air through the raised concealable mouthpiece 1010, the airflow caused by the sucking action activates the airflow activated switch 110 to electrically connect the positive terminal 1091 of the electrical power supply 109 to the positive terminal 10621 of the heating element 1062 of the vaporizer assembly 106 to vaporize the E-liquid in the E-liquid storage medium 1064, and generate the vaporized E-liquid for the user to enjoy.

Figure 10:
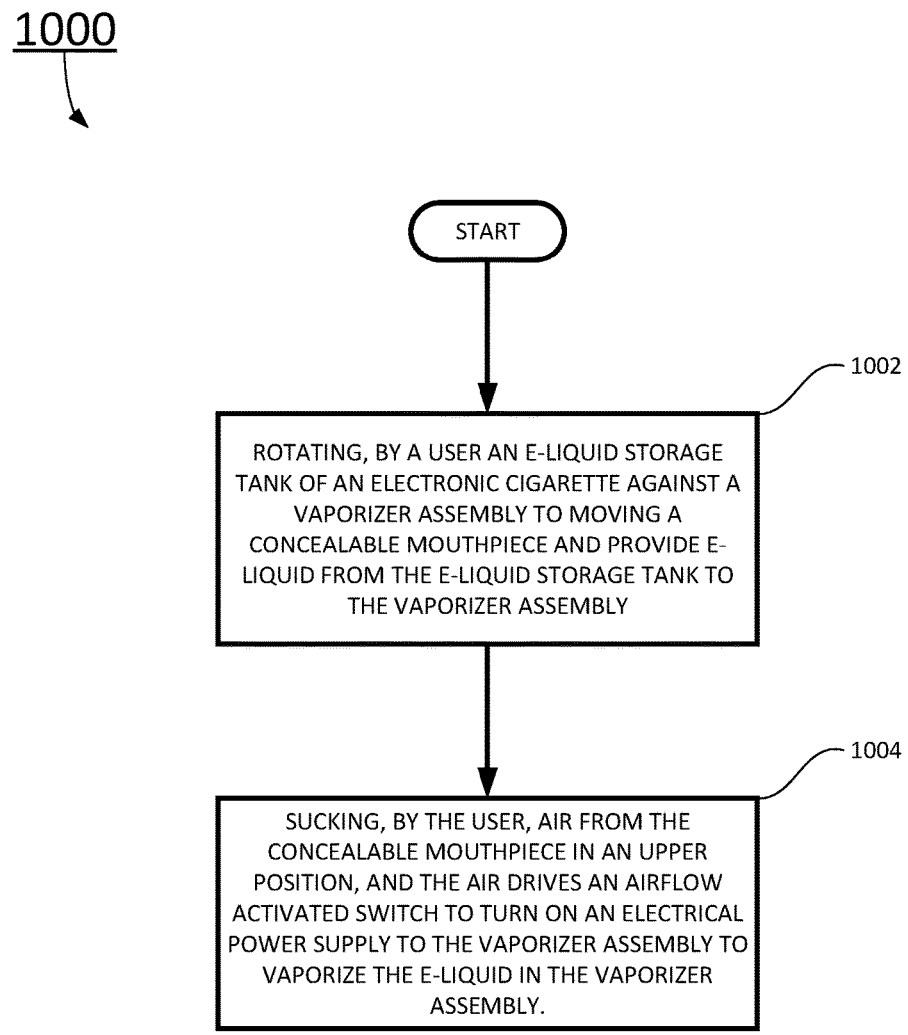
FIG. 10 is a flow chart of an exemplary method of using the electronic cigarette having the concealable mouthpiece according to certain embodiments of the present disclosure.

In yet another aspect, the present disclosure relates to a method 1000 of using an electronic cigarette 10 having a concealable mouthpiece assembly 101 as shown in FIG. 10.

At block 1002, a user rotates an E-liquid storage tank 103 of the electronic cigarette 10 against a vaporizer base 1061 in a first direction. Such rotation first moves the concealable mouthpiece 1010 upwards through a concealable mouthpiece moving mechanism 104, and second provide E-liquid supply from the E-liquid storage tank 103 to an E-liquid storage medium 1064 of a vaporizer assembly 106 of the electronic cigarette 10 through an E-liquid separation mechanism 105.

At block 1004, the users sucks air through an air path over the raised concealable mouthpiece 1010 such that the airflow caused by the sucking action activates an airflow activated switch 110 to electrically connect a positive terminal 1091 of an electrical power supply 109 to a positive terminal 10621 of a heating element 1062 of the vaporizer assembly 106 to vaporize the E-liquid in the E-liquid storage medium 1064.

In certain embodiments, the method may also include one or more of following operations: filling, by the user, E-liquid into the E-liquid storage tank 103 when the E-liquid in the E-liquid storage tank 103 is low or empty, and charging a rechargeable battery of the electrical power supply 109 when the rechargeable battery is low in power. The method may also include rotating, by the user, the E-liquid storage tank 103 of the electronic cigarette 10 against the vaporizer base 1061 in an opposite, second direction, to retract the concealable mouthpiece 1010, and to shut off the E-liquid supply from the E-liquid storage tank 103 to the E-liquid storage medium 1064 of the vaporizer assembly 106 of the electronic cigarette 10 through the E-liquid separation mechanism 105 when the user completes the use of the electronic cigarette 10.

What is claimed is:

1. A concealable mouthpiece assembly for an electronic cigarette, comprising:
    an E-liquid storage tank for storing E-liquid, wherein the E-liquid storage tank has a top end, a bottom end, an internal wall, and an external wall, wherein the E-liquid storage tank is positioned on an E-liquid separation base of an E-liquid separation mechanism and the E-liquid separation base is rotatably positioned on a vaporizer base;
    a mouthpiece moving mechanism attached to the top end of the E-liquid storage tank, wherein the mouthpiece moving mechanism defines a first mouthpiece moving groove and an opposite second mouthpiece moving groove; and
    a concealable mouthpiece having a vapor exit, a first mouthpiece moving rod, and an opposite, second mouthpiece moving rod, wherein the vapor exit of the concealable mouthpiece is installed inside of a mouthpiece cover with the vapor exit slidedly positioned inside of the internal wall of the E-liquid storage tank, the first mouthpiece moving rod extends into the first mouthpiece moving groove, and the second mouthpiece moving rod extends into the second mouthpiece moving groove,
    wherein when a user rotates the E-liquid storage tank against the vaporizer base in a first direction, the concealable mouthpiece is moved upward to be ready for the user to use the electronic cigarette, and when the user rotates the E-liquid storage tank against the vaporizer base in an opposite, second direction, the concealable mouthpiece is moved downward to be concealed in the mouthpiece cover.

2. The concealable mouthpiece assembly of claim 1, wherein the E-liquid separation mechanism comprises:
    the E-liquid separation base defining a first E-liquid opening, and a second E-liquid opening, wherein the E-liquid separation base is rotatably attached to the vaporizer base; and
    an E-liquid separation silicone gel ring defining a first E-liquid opening and a second E-liquid opening, wherein the E-liquid separation silicone gel ring is fixedly attached to the vaporizer base,
    wherein when the user rotates the E-liquid storage tank against the vaporizer base in a predetermined angle in the first direction, the first E-liquid opening and the second E-liquid opening of the E-liquid separation base coincide to the first E-liquid opening and the second E-liquid opening of the E-liquid separation silicone gel ring to allow the E-liquid stored in the E-liquid storage tank to flow into an E-liquid storage medium to be vaporized by a vaporizer assembly, and when the user rotates the E-liquid storage tank against the vaporizer base in the predetermined angle in the opposite, second direction, the first E-liquid opening and the second E-liquid opening of the E-liquid separation base do not coincide to the first E-liquid opening and the second E-liquid opening of the E-liquid separation silicone gel ring and the E-liquid flow between the E-liquid storage tank and the E-liquid storage medium is shut off.

3. The concealable mouthpiece assembly of claim 2, wherein the vaporizer assembly comprises:
    a heating element having a positive terminal, and a negative terminal electrically coupled to the vaporizer base, wherein the heating element is positioned on a heating element base;
    the E-liquid storage medium to receive the E-liquid from the E-liquid storage tank through the E-liquid separation mechanism;
    a vaporizer positive terminal electrically coupled to the positive terminal of the heating element and a positive terminal of an electrical power supply; and
    a vaporizer isolation ring to isolate the vaporizer positive terminal from the vaporizer base electrically connected to a negative terminal of the electrical power supply.

4. The concealable mouthpiece assembly of claim 3, wherein the heating element comprises:
    aluminum (Al);
    Chromium (Cr);
    Manganese (Mn);
    Iron (Fe);
    Cobalt (Co);
    Nickel (Ni);
    Copper (Cu);
    Zirconium (Zr);
    Niobium (Nb);
    Molybdenur (Mo);
    Rhenium (Re);
    Silver (Ag);
    Cadmium (Cd);
    Tantalum (Ta);
    Tungsten (W);
    Iridium (Ir);
    Platinum (Pt);
    Gold (Au); and
    alloys thereof.

5. The concealable mouthpiece assembly of claim 3, wherein the heating element comprises:
    a grid shaped heating element;
    a mesh shaped heating element;
    a net shaped heating element;
    a spiral heating element; and
    any combination thereof.

6. The concealable mouthpiece assembly of claim 3, wherein the E-liquid storage medium comprises:
    cotton fibers;
    polypropylene fibers;
    terylene fibers;
    nylon fibers; and
    porous ceramic materials.

7. An electronic cigarette comprising the concealable mouthpiece assembly of claim 1.

8. An electronic cigarette comprising:
    an E-liquid storage tank for storing E-liquid, wherein the E-liquid storage tank has a top end, a bottom end, an internal wall, and an external wall, wherein the E-liquid storage tank is positioned on an E-liquid separation base of an E-liquid separation mechanism and the E-liquid separation base is rotatably positioned on a vaporizer base;
    a concealable mouthpiece assembly having a concealable mouthpiece to be concealed in a mouthpiece cover when the electronic cigarette is not in use;

a vaporizer assembly having a heating element positioned on the vaporizer base to vaporize the E-liquid from the E-liquid storage tank; and the E-liquid separation mechanism having the E-liquid separation base and an E-liquid separation silicone gel ring to separate the E-liquid from the E-liquid storage tank from the vaporizer assembly, wherein when a user rotates the E-liquid storage tank against the vaporizer base in a first direction, the concealable mouthpiece is moved upward to be ready for the user to use the electronic cigarette, and when the user rotates the E-liquid storage tank against the vaporizer base in an opposite, second direction, the concealable mouthpiece is moved downward to be concealed in the mouthpiece cover.

9. The electronic cigarette of claim 8, wherein the concealable mouthpiece assembly comprises:

a mouthpiece moving mechanism attached to the top end of the E-liquid storage tank, wherein the mouthpiece moving mechanism defines a first mouthpiece moving groove and an opposite second mouthpiece moving groove; and the concealable mouthpiece having a vapor exit, a first mouthpiece moving rod, and an opposite, second mouthpiece moving rod, wherein the vapor exit of the concealable mouthpiece is installed inside of the mouthpiece cover with the vapor exit slidedly positioned inside of the internal wall of the E-liquid storage tank, the first mouthpiece moving rod extends into the first mouthpiece moving groove, and the second mouthpiece moving rod extends into the second mouthpiece moving groove, wherein when the user rotates the E-liquid storage tank against the vaporizer base in a first direction, the first mouthpiece moving groove and the second mouthpiece moving groove of the rotating mouthpiece moving mechanism push the first mouthpiece moving rod and the second mouthpiece moving rod of the concealable mouthpiece upwards such that the concealable mouthpiece is moved upward, and when the user rotates the E-liquid storage tank against the vaporizer base in the opposite, second direction, the first mouthpiece moving groove and the second mouthpiece moving groove of the rotating mouthpiece moving mechanism retract the first mouthpiece moving rod and the second mouthpiece moving rod of the concealable mouthpiece downwards such that the concealable mouthpiece is moved downward to be concealed in the mouthpiece cover.

10. The electronic cigarette of claim 8, wherein the E-liquid separation mechanism comprises:

the E-liquid separation base defining a first E-liquid opening, and a second E-liquid opening, wherein the E-liquid separation base is rotatably attached to the vaporizer base;

an E-liquid separation silicone gel ring defining a first E-liquid opening and a second E-liquid opening, wherein the E-liquid separation silicone gel ring is fixedly attached to the vaporizer base, wherein when the user rotates the E-liquid storage tank against the vaporizer base in a predetermined angle in the first direction, the first E-liquid opening, and the second E-liquid opening of the E-liquid separation base, coincide to the first E-liquid opening, and the second E-liquid opening of the E-liquid separation silicone gel ring to allow the E-liquid stored in the E-liquid storage tank to flow into an E-liquid storage medium to be vaporized by the vaporizer assembly, and when the user rotates the E-liquid storage tank against the vaporizer base in the predetermined angle in the opposite, second direction, the first E-liquid opening and the second E-liquid opening of the E-liquid separation base do not coincide to the first E-liquid opening and the second E-liquid opening of the E-liquid separation silicone gel ring and the E-liquid flow between the E-liquid storage tank and the E-liquid storage medium is stopped.

11. The electronic cigarette of claim 8, wherein the vaporizer assembly comprises:

the E-liquid storage medium to receive the E-liquid from the E-liquid storage tank through the E-liquid separation mechanism;

the heating element positioned on a heating element base and in direct contact with an interior surface of the E-liquid storage medium to heat the E-liquid received from the E-liquid storage tank, wherein the heating element comprises a positive terminal, and a negative terminal electrically coupled to the vaporizer base;

a vaporizer positive terminal electrically coupled to the positive terminal of the heating element, and a positive terminal of an electrical power supply; and a vaporizer isolation ring to isolate the vaporizer positive terminal from the vaporizer base electrically connected to a negative terminal of the electrical power supply.

12. The electronic cigarette of claim 11, wherein the heating element comprises:

aluminum (Al);
Chromium (Cr);
Manganese (Mn);
Iron (Fe);
Cobalt (Co);
Nickel (Ni);
Copper (Cu);
Zirconium (Zr);
Niobium (Nb);
Molybdenur (Mo);
Rhenium (Re);
Silver (Ag);
Cadmium (Cd);
Tantalum (Ta);
Tungsten (W);
Iridium (Ir);
Platinum (Pt);
Gold (Au); and
alloys thereof.

13. The electronic cigarette of claim 11, wherein the E-liquid storage medium comprises:

cotton fibers;
polypropylene fibers;
terylene fibers;
nylon fibers; and
porous ceramic materials.

14. The electronic cigarette of claim 11, further comprising an Electronic cigarette body, wherein the Electronic cigarette body comprises:

a cylindrical electronic cigarette body having an electronic cigarette base at a bottom end of the cylindrical electronic cigarette body, and an electrical power contact ring at a top end of the cylindrical electronic cigarette body, wherein the electronic cigarette base comprises one or more air intake openings to form an air path.

15. The electronic cigarette of claim 14, wherein the Electronic cigarette body further comprises:

the electrical power supply positioned inside the cylindrical electronic cigarette body, wherein the electrical power supply comprises a positive terminal electrically coupled to the positive terminal of the heating element through an airflow activated switch; and a negative terminal electrically coupled to the Electronic cigarette body.

16. The electronic cigarette of claim 15, further comprising the airflow activated switch, wherein after the user rotates the E-liquid storage tank against the vaporizer base to raise the concealable mouthpiece and allows the E-liquid stored in the E-liquid storage tank to flow into the E-liquid storage medium, the users sucks air through the air path over the raised concealable mouthpiece such that the airflow caused by the sucking action activates the airflow activated switch to electrically connect the positive terminal of the electrical power supply to the positive terminal of the heating element to vaporize the E-liquid in the E-liquid storage medium.

17. The electronic cigarette of claim 11, wherein the electrical power supply comprises a rechargeable battery.

18. The electronic cigarette of claim 17, wherein the Electronic cigarette body comprises a universal serial bus (USB) port to recharge the rechargeable battery.

19. A method of using an electronic cigarette having a concealable mouthpiece, comprising:
    rotating, by a user, an E-liquid storage tank of the electronic cigarette against a vaporizer base in a first direction, to raise the concealable mouthpiece, and to turn on an E-liquid flow from the E-liquid storage tank to an E-liquid storage medium of a vaporizer assembly of the electronic cigarette through an E-liquid separation mechanism; and
    sucking, by the user, air through an air path over the raised concealable mouthpiece such that the airflow caused by the sucking action activates an airflow activated switch to electrically connect a positive terminal of an electrical power supply to a positive terminal of a heating element of the vaporizer assembly to vaporize the E-liquid in the E-liquid storage medium.

20. The method of claim 19, further comprising one or more of:
    filling, by the user, E-liquid into the E-liquid storage tank, when the E-liquid in the E-liquid storage tank is low or empty;
    charging a rechargeable battery of the electrical power supply, when the rechargeable battery is low in power; and
    rotating, by the user, the E-liquid storage tank of the electronic cigarette against the vaporizer base in an opposite, second direction, to retract the concealable mouthpiece, and to shut off the E-liquid flow from the E-liquid storage tank to the E-liquid storage medium of the vaporizer assembly of the electronic cigarette through the E-liquid separation mechanism, when the user completes the use of the electronic cigarette.

* * * * *